United States Patent [19]

Boozer

[11] 4,218,226

[45] Aug. 19, 1980

[54] VACUUM APPARATUS

[75] Inventor: John D. Boozer, Ocala, Fla.

[73] Assignee: Link Built Products of Ocala, Inc., Ocala, Fla.

[21] Appl. No.: 927,805

[22] Filed: Jul. 25, 1978

[51] Int. Cl.² .............................................. B01D 45/12
[52] U.S. Cl. ......................................... 55/274; 15/323;
 15/340; 55/345; 55/356; 55/385 B; 55/419;
 55/432; 55/439; 55/447; 55/458
[58] Field of Search ................ 55/319, 342, 356, 419,
 55/385 B, 439, 467, 345, 447, 458, 274, 432;
 15/340, 352, 323, 353

[56] References Cited

U.S. PATENT DOCUMENTS

| | | | |
|---|---|---|---|
| 2,193,784 | 3/1940 | Smith | 55/419 X |
| 2,951,632 | 9/1960 | Hanson | 15/340 X |
| 2,973,544 | 3/1961 | Romaniuk | 15/340 |
| 3,304,572 | 2/1967 | Wendel | 15/340 |
| 3,406,423 | 10/1968 | Young | 15/340 |
| 3,541,631 | 11/1970 | Kluge et al. | 55/342 X |
| 3,870,489 | 3/1975 | Shaddock | 55/319 X |
| 3,930,817 | 1/1976 | Stevenson et al. | 55/385 B X |
| 3,955,236 | 5/1976 | Mekelburg | 55/319 X |
| 4,111,670 | 9/1978 | De Marco | 55/385 B X |

FOREIGN PATENT DOCUMENTS

| | | | |
|---|---|---|---|
| 1302558 | 7/1962 | France | 55/447 |
| 604826 | 7/1948 | United Kingdom | 55/447 |
| 171879 | 12/1965 | U.S.S.R. | 15/340 |

Primary Examiner—Kathleen J. Prunner
Attorney, Agent, or Firm—Watson, Cole, Grindle & Watson

[57] ABSTRACT

In apparatus for vacuuming particulate matter an enclosed housing includes at least one inlet for ingress of particulate matter and at least one outlet enabling air to egress from the housing, the inlet and outlet being oppositely disposed. A fan is connected to the at least one inlet and one outlet to generate a partial vacuum within the housing, and a cyclone is connected to the at least one outlet removing secondary particulate matter contained in the particulate matter. A duct interconnects the cyclone and a region of the housing spaced therefrom for conducting air from the housing to the cyclone. A duct inlet in the form of a slit extends transversely across the housing in the region of the at least one inlet. The inlet and duct inlet cause the air and entrained particulate matter to swirl within the region in the housing between the at least one inlet and the at least one outlet thereby depositing primary particulate matter within the housing and causing secondary particulate matter to enter the duct inlet.

18 Claims, 6 Drawing Figures

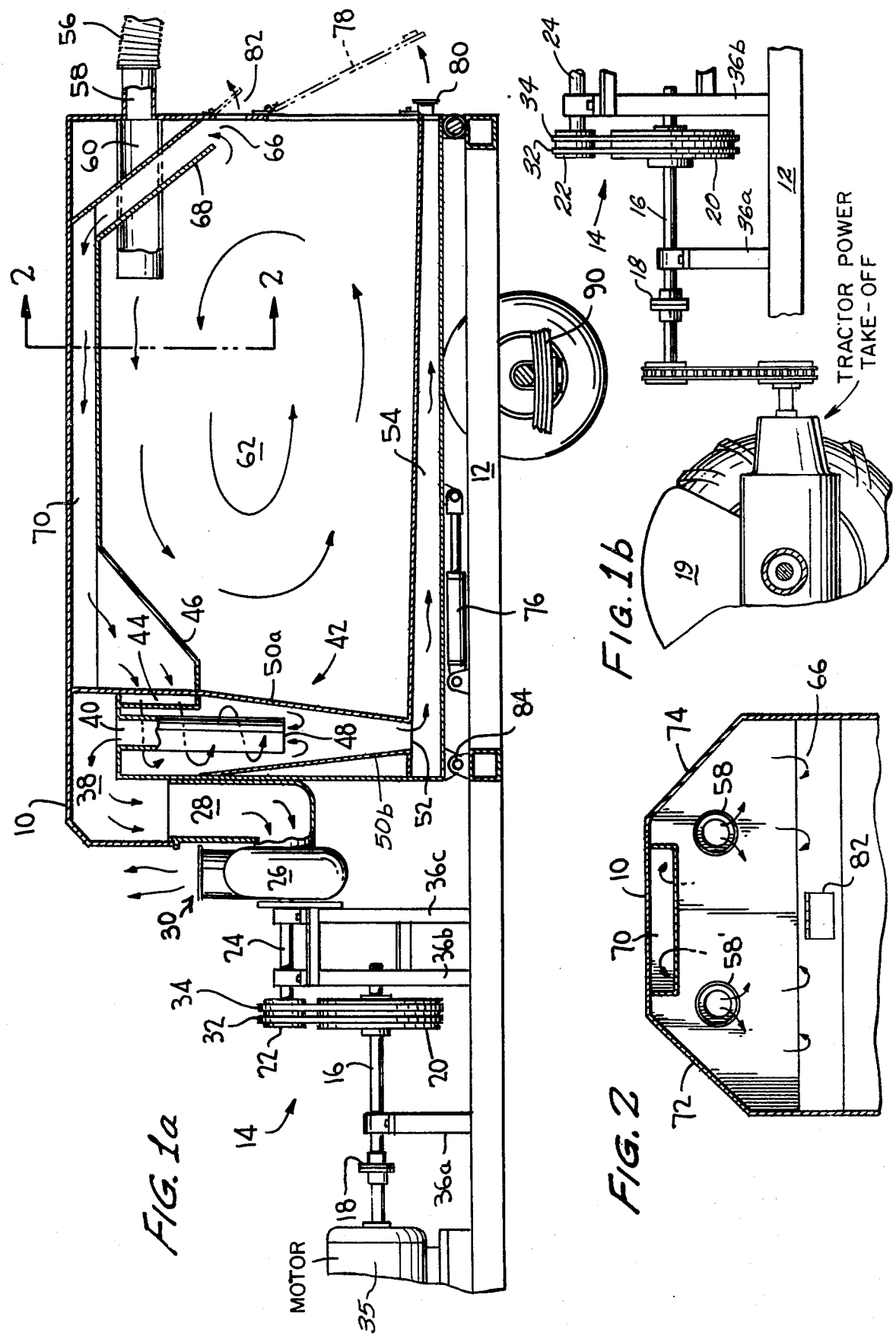

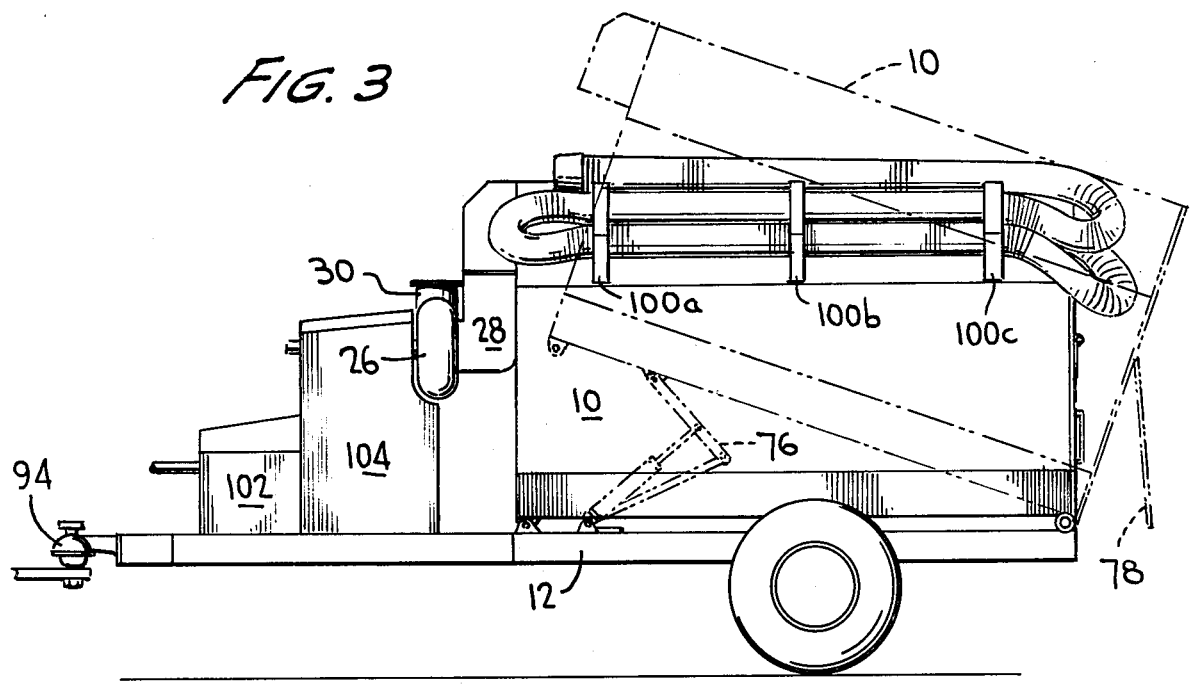
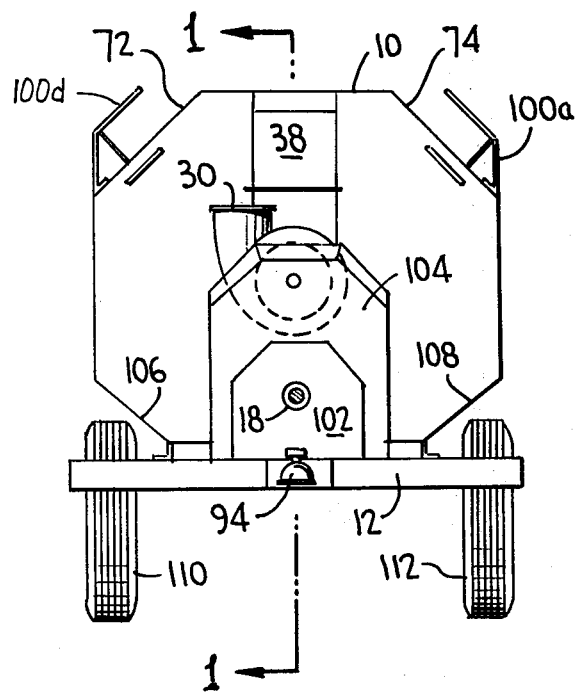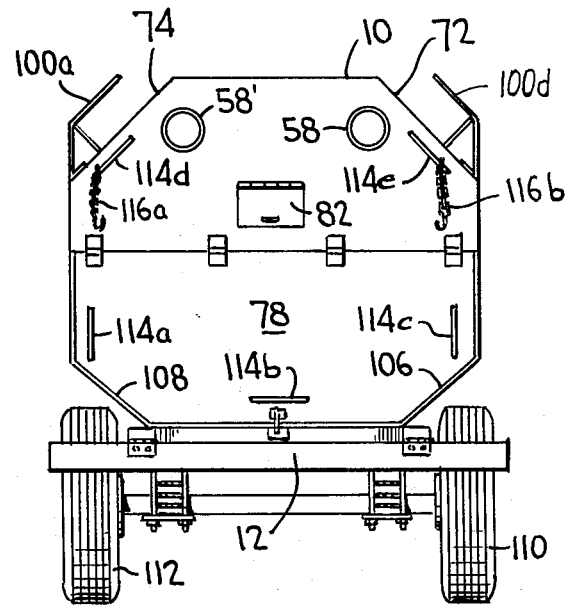

VACUUM APPARATUS

BACKGROUND OF THE INVENTION

1. Field of the Invention

This invention relates to all-purpose industrial and farm apparatus for vacuuming particulate matter.

2. Prior Art

In known prior art vacuuming apparatus the particulate matter is filtered to separate the primary and secondary particulate matter from one another for the purpose of preventing damage to the fan blades by heavy or coarse particulate matter as the air egresses from the fan blades. The filter and/or baffle generally comprises a screen having a desired mesh for separating the primary and secondary particulate matter. However, in such prior art vacuuming apparatus, the filter has a tendency to become clogged, which necessitates cleaning of the filter and a shutting-down of the vacuuming apparatus. Additionally, the filter and/or baffle may be damaged by the particulate material such that they require frequent replacement. Also, the secondary particulate matter which passes through the fan mechanism damages the fan blades, thereby reducing the useful life of the fan mechanism. Moreover, in prior art vacuuming apparatus using a baffle, primary particulate matter may also be drawn into the fan blades, especially as the hopper becomes filled to an extent such that the baffle parts become partially clogged, thereby increasing the air velocity and picking-up primary particulate matter.

All of the above problems, when taken as a whole, cause inefficient operation as well as result in considerable down-time of the vacuuming apparatus, which decreases the efficiency of the vacuuming apparatus as well as increasing both labor and machine operating costs.

While such problems are generic to all filter and baffle type vacuuming apparatus, whether used in an industrial or a farm application, particular problems are encountered when using a vacuuming apparatus for such purposes as, for example, the cleaning of horse stalls, paddocks, and areas adjacent thereto. The manure and other heavy primary particulate matter which is vacuumed by a conventional vacuuming apparatus using a filter system referred to generally above, is so inefficient as a result of the clogging of the filter and the necessity of cleaning that such filter vacuum apparatus is absolutely impractical for such usage. It has been my experience that the use of such filter type vacuum apparatus requires shutting-down of the vacuum equipment within forty-five seconds to one minute of vacuuming operation as a result of filter clogging.

Therefore, as a result of filter clogging, the necessity of shutting down the vacuum apparatus and cleaning the filter, the use of prior art filter type vacuuming apparatus for the purpose of cleaning horse stalls and areas associated therewith by such apparatus is impractical from a commercial standpoint because of both uneconomic and lack of ease of use considerations.

Moreover, even in industrial or commerical applications, in which the filter takes longer to clog, it eventually requires replacement, and in general filter vacuum type apparatus is relatively inefficient.

SUMMARY OF THE INVENTION

It is a primary object of the present invention to provide improved vacuuming apparatus which eliminates the aforementioned problems of prior art vacuuming apparatus by eliminating the need of a filter.

It is a further object of the present invention to provide vacuuming apparatus for all-purpose industrial and farm use.

It is yet a further object of the present invention to increase the efficiency, operating life and ease of use of vacuuming apparatus for both industrial and farm application.

It is still a further object of the present invention to provide vacuuming apparatus of the type specified herein which can be operated either from the power take-off of a tractor, or from a primary motive power source on a trailable, or self-powered vehicle, respectively.

It is yet still a further object of the present invention to provide a vacuuming apparatus for all-purpose industrial and farm use in which the exhaust air is substantially free of dust particles that normally egress from prior art vacuuming apparatus, thereby decreasing pollution and aiding in the enhancement of the environment.

In accordance with the present invention, an enclosed hopper includes at least one inlet for ingress of particulate matter and an outlet for egress of air from the hopper oppositely disposed from one another. A fan is connected to the outlet for generating a partial vacuum with the hopper. A cyclone is vertically mounted within the hopper and has an outlet connected to the hopper outlet and an off-center inlet for the intake of air from a chamber within the hopper. A duct interconnects the inlet of the cyclone with a region of the chamber spaced therefrom for conducting air from the chamber to the cyclone and thence to the hopper outlet duct and through the fan outlet.

The vacuum apparatus enables primary particulate matter to be vacuumed through at least one inlet and deposited within the chamber such that the efficiency of the apparatus actually increases with the storage of the primary particulate. Secondary particulate matter is entrapped by the cyclone and deposited in a false bottom of the hopper.

As is readily apparent to one of ordinary skill in the art from the description herein, the essential difference between primary particulate matter and secondary particulate matter is that the former is heavier than the latter, such that primary particulate can be separated from secondary particulate by the swirling of air in which the primary and secondary particulate matter is entrapped.

The primary particulate as well as a portion of the secondary particulate is removed through a hinged door by tilting of the hopper.

BRIEF DESCRIPTION OF THE FIGURES

The above mentioned, as well as other, objects, advantages and features of the invention as set forth above will be more apparent from the following description taken in conjunction with the drawings wherein:

FIG. 1a is a side cross-sectional elevational view of the vacuuming apparatus in accordance with an exemplary embodiment of the present invention;

FIG. 1b is a detailed view illustrating the use of the power take-off of a tractor to power the vacuuming apparatus;

FIG. 2 is a cross section taken along lines 2—2 of FIG. 1a and illustrating the intake duct within an interior chamber of the housing and a portion of the internal ductwork of the vacuuming apparatus;

FIG. 3 is a side view of vacuuming apparatus in accordance with an exemplary embodiment of the present invention; and FIGS. 4 and 5 are respective front and rear views of the apparatus illustrated in FIG. 1a.

DETAILED DESCRIPTION

With respect to FIG. 4, the vacuuming apparatus is mounted on wheeled trailer frame 12 such that housing 10 is hydraulically liftable from frame 12. In the particular embodiment of FIG. 1a, power drive assembly 14 includes power drive shaft 16 having an end 18 thereof adapted for connection to the power take-off of, from example, a farm tractor 19 as illustrated in FIG. 1b. The other end of shaft 16 carries drive pulley 20. Reduction pulley 22 is mounted on fan blower shaft 24. Fan 26 includes inlet 28 and outlet or exhaust 30. V-belts 32, 34 engage power pulley 20 and reduction pulley 22. An idler pulley (not shown) may also be used as is well known to those skilled in the art. Power drive assembly 14 is suitably mounted to trailer frame 12 by supports 36a, 36b and 36c as illustrated in FIG. 1a. Disconnection of v-belts 32, 34 from pulleys 20, 22 enables fan 26 to be directly driven from an appropriate, alternate power system, such as an electric motor 35, which may also be mounted to tractor frame 12.

In the exemplary embodiment of FIG. 4, fan 26 is a twenty-inch cast steel housing fan with a blower capacity of 11,000 cubic feet per minute. Fan 26 has six-inch blades with a twelve-inch intake 28.

Inlet 28 of fan 26 is air-tightly connected to outlet duct 38 with housing 10 lying on the bed of trailer frame 12 and the latter duct communicates with outlet 40 of cyclone 42, which is vertically mounted to the front of housing 10. Cyclone 42 includes an off-center intake 44 connected to intake duct portion 46 as illustrated in FIG. 1a. Air introduced into the off-center inlet portion 44 of cyclone 42 circulates downwardly in a cyclonic-type motion as illustrated by the arrows in FIG. 1a and is sucked upwardly into intake 48 of the cyclone and exits at outlet port 40. Secondary particulate matter entrained in the air introduced into the cyclone is entrapped on slanted walls 50a, 50b and then subsequently falls through opening 52 to bottom compartment 54 of housing 10.

The particulate matter is vacuumed into housing 10 via one or a pair of hoses attached respectively to inlet pipes 58, 58' (FIG. 2), only one hose 56 being illustrated in FIG. 1a. In the embodiment of FIG. 1a, hose 56 has an inner diameter of six inches and overlaps six-inch outer diameter inlet pipe 58. Inlet pipe 60 has an inner diameter of approximately eight inches. The increased diameter of inlet pipe 60 enhances the deposition of "light" primary particulate matter in chamber 62 of housing 10 due to the decrease in the air velocity in which the particulate matter is entrained resulting from the increased diameter of inlet pipe 60 over that of inlet pipe 58. In the case of vacuuming "heavy" particulate matter, inlet pipe 60 may be removed.

The vacuum induced in chamber 62 by the operation of fan 26 and the disposition of the inlets 58, 58' and strip inlet 66 cause the air to circulate approximately in accordance with the arrows illustrated in FIG. 1a within chamber 62. Such circulation of air also enhances the deposition of the primary particulate matter on the floor of chamber 62 such that the primary particulate matter loads to the front of the chamber. The air is then sucked into strip inlet 66 of duct 68 and then into duct 70 which interconnects duct 68 and inlet duct portion 46 to cyclone 42.

As illustrated in FIG. 2, strip inlet 66 extends substantially the whole width of housing 10. Also illustrated in FIG. 2 is a preferred embodiment in which two inlets 58, 58' are provided in the rear wall of housing 10. Housing 10 preferably also has slanted upper wall members 72, 74, which enables storage of the flex hoses and aids in maneuvering the housing into position through or about archways of buildings and other structure around which the vacuuming apparatus may be used.

With continuing reference to FIG. 1a, and with further reference to FIG. 3, housing 10 is hydraulically liftable by means of hydraulic mechanism 76 so as to be positioned as illustrated by the phantom line in FIG. 3 to enable particulate matter to be emptied from compartment 62 via hinged door 78, which is latchable to the rear wall of housing 10 by latch 80 when housing 10 is retracted onto the bed of trailer frame 12 as the vacuuming apparatus is being operated to vacuum particulate matter. Hinged door 78 also encloses an opening (not illustrated) in compartment 54 such that the secondary particulate matter collected by cyclone 42 and deposited therein can be partially emptied.

Compartment 54 is fully emptied by operation of the vacuum apparatus with hinged door 78 open and the secondary particulate matter is sucked through opening 52, cyclone 42 and ejected through outlet port 30 of fan 26.

Observation port 82 enables an operator to visually inspect the interior of compartment 62 to determine its condition, even during operation of the vacuuming apparatus. Housing 10 is locked to the bed of trailer frame 12 by a suitable locking pin arrangement 84.

In the preferred embodiment of FIG. 1a, housing 10 is built of ten-gauge steel and has approximately an eight cubic yard capacity. Its overall size is five feet in width by nine feet in length by five feet six inches in height. The vacuum apparatus has a two vacuum hose capability using six-inch flex hose in standard lengths of thirty-three feet. Trailer frame 12 is reinforced with six-inch I-beams and is approximately thirteen feet six inches in length, six feet in width, and the total height of the unit from the ground is approximately seven feet five inches. A bulldog hitch 94 (FIG. 4) for accommodating a two-inch ball is also provided. Trailer frame 12 has a heavy-duty axle and spring assembly 90. Hydraulic assembly 76 may consist of a five-ton hydraulic scissor jack for dumping the particulate matter from compartment 62 of housing 10.

With respect to FIG. 3, the housing illustrated in phantom line shows the housing 10 lifted by hydraulic mechanism 76 from the bed of trailer 12 with hinged door 78 open to enable either or both primary and secondary particulate matter to be emptied from the housing. One flex hose 56 is shown stored in inoperative position on top of housing 10 by means of hose supports 100a, 100b, 100c and 100d (which are more clearly illustrated in FIGS. 4 and 5). Also illustrated in FIG. 3 are covers 102, 104 for enclosing the power drive assembly 14 of the vacuum apparatus.

FIGS. 4 and 5, which are respective front and rear views of the apparatus, illustrate the generally octagonal cross-sectional shape of housing 10. Upper sloping portions 72, 74 allow for storage of two flex hoses, one each on sloping surface 72 and 74 without materially or significantly increasing the overall height of the vacuum apparatus. As mentioned previously, the sloping upper walls 72, 74 also aid in maneuvering the vacuum apparatus in and around buildings and other structures. Lower sloping wall members 106, 108 enable housing 10 to clear wheels 110, 112 and also aid in centering the deposition of particulate matter within compartment 62 of housing or hopper 10. Hose supports 100a, 100b, 100c and 100d, also serving as hand-holds, enable an operator to gain access to the hose storage area.

As illustrated in FIG. 5, handles 114a, 114b and 114c are provided on flap hatch door 78 and the back of housing 10. Hand-holds 114d and 114e are provided as illustrated to enable an operator to gain access to the hose storage atop sloping wall portion 72, 74 as well as to fit the flex hoses to the appropriate inlet pipes 58, 58'. Chains 116a and 116b are respectively attached to hand-holds 114d and 114e and serve to support hinged door 78 in its open position by respective attachment to handles 114a and 114c.

One of ordinary skill in the art will readily recognize that various modifications and alterations can be made to the vacuuming apparatus, an exemplary embodiment of which has been described. For example, and without limitation, the following modifications and alterations may be made. Fan 26 may be driven from a self-contained motor drive assembly mounted on trailer 12 rather than being driven from the power take-off of a tractor. Typically, for the embodiment shown in FIG. 1, the power take-off rotates at approximately 540 r.p.m. and the blower of fan 26 rotates at 3,000 r.p.m. However, the reduction gear may be varied to accommodate a different sized fan having different rates of rotation. Also, the size and shape of the various ducts and inlet and outlet ports of the vacuum system may be modified to accommodate various different uses and application of the vacuum apparatus. Such modifications can be made provided that the ducts and various inlet and outlet passages, including those of the cyclone, have air capacities sufficient to avoid unnecessary friction and resistance of the air movement therein. In other words, the duct and outlet capacity from inlet 58, inlet 66, duct 68, duct 70, inlet duct 46, cyclone 42 and housing outlet duct 38 must be sized in accordance with the capacity of fan 26 so that there is no unnecessary reduction in the air flow throughout the system and fan. The techniques and principles involved in the sizing of the various ducts in the vacuum apparatus are well known to those skilled in the art and therefore it is unnecessary to elaborate on such principles for the purposes of the present invention.

As will be apparent to those skilled in the art, a significant advantage is obtained from the vacuum apparatus of the invention in that it avoids the use of baffles and/or filters which are absolutely necessary in prior art vacuuming apparatus. Of particular significance is the manner in which the vacuum is created by the vacuum apparatus, namely by sucking air through an inlet of the hopper or housing into a chamber in which the primary particulate matter is to be deposited; and then sucking air from the chamber within the hopper through a duct system and introducing such air into a cyclone for the purpose of entrapping or removing secondary particulate matter entrained in the air; and finally expelling or exhausting the cleaned air from the outlet of the cyclone through the outlet of the fan. It is therefore readily apparent that in accordance with the vacuum apparatus of the present invention, significant advantages are obtained in the cost of operating such apparatus, which eliminates the necessity of cleaning or replacing filters and also increases the operating life of the fan and blower assembly.

It is also to be noted that in accordance with the principles of operation of the vacuum apparatus, its efficiency actually increases as compartment 62 of housing or hopper 10 is filled with particulate matter. This is contrary to prior art vacuum apparatus utilizing baffle systems in which the operation of vacuuming apparatus is considerably decreased or impeded as the apparatus is filled with particulate matter due to either the clogging of the baffle port or ports, and the introduction of particulate matter into the air stream as the velocity of air to the baffle is increased due to constriction of its ports.

Although a filter is not necessary with the vacuum apparatus, a filter may be installed, for example, in outlet duct 38, to provide further entrapment of particulate matter.

I claim:

1. Apparatus for vacuuming particulate matter, comprising:
    an enclosed barrierless chamber including at least one inlet for ingress of air and said particulate matter for collecting primary particulate matter and an outlet enabling air and secondary particulate matter to egress from said chamber, said barrierless chamber being formed without internal obstructions to enable substantially free movement of said air and particulate matter therein;
    cyclone means mounted outside said chamber and including an intake connected to said outlet for removing said secondary particulate matter;
    fan means for generating a partial vacuum within said chamber through said cyclone means; and
    duct means for conducting the air and secondary particulate matter from said outlet to said intake, and including a duct inlet disposed within said chamber in the region of said at least one inlet, said duct inlet defining said outlet, said at least one inlet being disposed with respect to said duct inlet such that the air and entrained particulate matter is caused to swirl within said barrierless chamber, thereby depositing primary particulate matter in said chamber and causing the air and secondary particulate matter to enter said duct inlet.

2. Apparatus as in claim 1 wherein said cyclone means includes a compartment connected thereto for collecting said secondary particulate matter.

3. Apparatus for vacuuming particulate matter as in claim 2 wherein said compartment is located underneath said cyclone means and enclosed chamber.

4. Apparatus as in claim 1 further comprising means for removing primary and secondary particulate matter from said chamber and said cyclone means.

5. Apparatus as in claim 1 further comprising wheeled means for mounting said barrierless chamber, said cyclone means and said fan means, and means mounted on said wheeled means for connection to a powered vehicle.

6. Apparatus as in claim 1 further comprising means for tilting said chamber and cyclone means to aid in removing primary and secondary particulate matter therefrom.

7. Apparatus as in claim 1 wherein said fan means is adapted to be driven by the power take-off from a tractor.

8. Apparatus as in claim 1 wherein said fan means is driven from a primary power source.

9. Apparatus as in claim 1 wherein there are two inlets.

10. Apparatus for vacuuming particulate matter as in claim 1 wherein said at least one inlet includes a pipe extending into the interior of said enclosed chamber, and said at least one inlet is located above said duct inlet.

11. Apparatus for vacuuming particulate matter as in claim 1 further comprising at least one extension hose for connection to said at least one inlet, and said enclosed chamber further including means for storing said at least one extension hose on the exterior thereof.

12. Apparatus as in claim 1 wherein said duct inlet is in the form of a slit extending substantially transversely across said chamber.

13. Apparatus as in claim 1 wherein said duct means includes an elongated first portion extending substantially along an upper region of said enclosed chamber, a second portion extending in sloping relationship from one end of said first portion to said duct inlet, and an enlarged third portion extending from the other end of said first portion to said intake.

14. Apparatus as in claim 1 or 13 wherein said at least one inlet and said cyclone means are oppositely disposed such that the air and particulate matter are expelled from said at least one inlet in the direction of said cyclone means so as to cause the primary particulate matter to be deposited in the portion of said enclosed chamber adjacent said cyclone means.

15. Apparatus as in claim 1 wherein said duct inlet lies in the region of said enclosed chamber below said at least one inlet.

16. Apparatus as in claim 1 wherein said enclosed chamber includes an observation port for observing the interior of said enclosed chamber.

17. Apparatus as in claim 1 wherein said cyclone means includes a hollow central outlet duct and said air exits said cyclone means through an intake at one end of said central outlet duct.

18. Apparatus as in claim 1 wherein said cyclone means includes walls slanting inwardly towards one another.

* * * * *